(12) United States Patent
Piraube et al.

(10) Patent No.: US 12,216,342 B2
(45) Date of Patent: Feb. 4, 2025

(54) METHOD AND SYSTEM FOR DETERMINING PARAMETERS USED TO MANUFACTURE AN OPTICAL ARTICLE AND A CORRESPONDING OPTICAL ARTICLE

(71) Applicant: ESSILOR INTERNATIONAL, Charenton-le-Pont (FR)

(72) Inventors: Sébastien Piraube, Dallas, TX (US);
Kord Schrowangen, Dallas, TX (US);
Charles Goodrum, Dallas, TX (US);
Brad Gelb, Dallas, TX (US)

(73) Assignee: Essilor International, Charenton-le-Pont (FR)

( * ) Notice: Subject to any disclaimer, the term of this patent is extended or adjusted under 35 U.S.C. 154(b) by 916 days.

(21) Appl. No.: 17/294,276

(22) PCT Filed: Nov. 6, 2019

(86) PCT No.: PCT/EP2019/080353
§ 371 (c)(1),
(2) Date: May 14, 2021

(87) PCT Pub. No.: WO2020/099202
PCT Pub. Date: May 22, 2020

(65) Prior Publication Data
US 2022/0004025 A1    Jan. 6, 2022

(30) Foreign Application Priority Data

Nov. 15, 2018 (EP) ..................................... 18306495

(51) Int. Cl.
*G02C 7/02* (2006.01)
*G06N 3/04* (2023.01)

(52) U.S. Cl.
CPC ............... *G02C 7/027* (2013.01); *G06N 3/04* (2013.01)

(58) Field of Classification Search
CPC .......... G02C 7/027; G02C 7/028; G06N 3/04; G06N 3/084
See application file for complete search history.

(56) References Cited

U.S. PATENT DOCUMENTS

| | | | |
|---|---|---|---|
| 5,724,258 A | 3/1998 | Roffman | |
| 2003/0090623 A1 | 5/2003 | Rubinstein et al. | |

(Continued)

FOREIGN PATENT DOCUMENTS

| | | |
|---|---|---|
| CN | 106022518 A | 10/2016 |
| EP | 0 397 136 A2 | 11/1990 |

(Continued)

OTHER PUBLICATIONS

Chih-Ta Yen, et al., "Aspherical lens design using hybrid neural-genetic algorithm of contact lenses", Applied Optics, vol. 54, No. 28, published Aug. 19, 2015, pp. E88-E93 (6 pages).

(Continued)

*Primary Examiner* — Collin X Beatty
(74) *Attorney, Agent, or Firm* — NIXON & VANDERHYE

(57) ABSTRACT

This method for determining specification parameters used to manufacture an optical article includes steps of: training at least one neural network to predict the specification parameters, by using a training data set including a plurality of training prescription parameters and corresponding training specification parameters; and predicting specification parameters of the optical article by the at least one neural network, from prescription parameters relating to the optical article, on the basis of the training.

16 Claims, 2 Drawing Sheets

(56) References Cited

U.S. PATENT DOCUMENTS

2015/0331256 A1* 11/2015 Baudart ............... B24B 13/005
                                                          351/159.73
2017/0311095 A1    10/2017 Fitz et al.
2019/0382208 A1* 12/2019 Meschenmoser ...... B65G 29/00

FOREIGN PATENT DOCUMENTS

| WO | 02/088830      | 11/2002 |
| WO | 2005/050289 A1 | 6/2005  |
| WO | 2005/050290    | 6/2005  |

OTHER PUBLICATIONS

Extended European Search Report for EP Application No. 18306495.5 dated Jun. 3, 2019, 8 pages.
International Search Report for PCT/EP2019/080353 dated Feb. 7, 2020, 4 pages.
Written Opinion of the ISA for PCT/EP2019/080353 dated Feb. 7, 2020, 6 pages.
Office Action issued in Chinese Patent Application No. 201980074614.5 dated Jul. 28, 2022.

* cited by examiner

METHOD AND SYSTEM FOR DETERMINING PARAMETERS USED TO MANUFACTURE AN OPTICAL ARTICLE AND A CORRESPONDING OPTICAL ARTICLE

This application is the U.S. national phase of International Application No. PCT/EP2019/080353 filed Nov. 6, 2019 which designated the U.S. and claims priority to EP patent application Ser. No. 18/306,495.5 filed Nov. 15, 2018, the entire contents of each of which are hereby incorporated by reference.

FIELD OF THE INVENTION

The present invention relates to a method and system for determining parameters used to manufacture an optical article, as well as to a corresponding optical article.

BACKGROUND OF THE INVENTION

Manufacturing optical articles such as ophthalmic lenses implies surfacing complex optics on the rear face and possibly also front face of semi-finished lenses, applying added value treatments and edging the lenses so that they fit in a frame chosen by the patient. To that end, each order for a pair of glasses contains the prescription of the patient as well as the features of the desired final product, such as the frame, the optical design, the options, the added values, etc.

The complex optics as well as the manufacturing parameters needed to make the final products are usually computed on the fly for each order coming into the production laboratory. Such computation is done using sophisticated calculation software, referred to as a lens design software (LDS).

Today, LDS systems usually run the above-mentioned computation for every job sent to them by a laboratory management system (LMS). This computation involves long logic and algorithm execution, as well as mathematical optimizations.

As a consequence, the computation consumes a lot of resources related to information technology, such as computers, server farms, software licenses, load balancers for distributing jobs according to the processing load of a plurality of servers, etc. This incurs a significant cost for optical article manufacturing companies.

In addition, it is necessary to size server resources in order to process the maximum load that may be requested at any given moment. This means that, if the production laboratories enter their respective jobs for the day at the same time, the server resources must be sized in such a manner as to be able to process all those simultaneous orders, even if, during the rest of the day, those server resources do not have the same workload.

Therefore, there is a need to reduce the time required to compute the optical and other parameters used to manufacture an optical article for a given prescription.

SUMMARY OF THE INVENTION

An object of the invention is to overcome the above-mentioned drawbacks of the prior art.

To that end, the invention provides a method for determining specification parameters used to manufacture at least one ophthalmic lens, the specification parameters including optical and/or geometrical data relating to the at least one ophthalmic lens, and/or at least one parameter relating to a manufacturing process required to manufacture the at least one ophthalmic lens, remarkable in that it comprises steps of:

training at least one neural network to predict the specification parameters, by using a training data set comprising a plurality of training prescription parameters and corresponding training specification parameters; and predicting specification parameters of the at least one ophthalmic lens by means of the at least one neural network, from prescription parameters relating to the at least one ophthalmic lens, on the basis of the training.

Therefore, due to the leveraging of neural networks for predicting parameters used to manufacture the optical article, the computation time is reduced, the service level of production laboratories and optical stores to customers is increased, the requirement for sizing the information technology back-end system is reduced and the resulting costs for optical article manufacturing companies are reduced.

The invention also provides a system for determining specification parameters used to manufacture at least one ophthalmic lens, the specification parameters including optical and/or geometrical data relating to the at least one ophthalmic lens, and/or at least one parameter relating to a manufacturing process required to manufacture the at least one ophthalmic lens, remarkable in that it comprises at least one neural network predicting the specification parameters by performing steps of a method as succinctly described above.

The invention further provides an ophthalmic lens, remarkable in that it is manufactured by using specification parameters determined by implementing a method as succinctly described above.

The invention further provides a computer program product comprising one or more sequences of instructions that are accessible to a processor and that, when executed by the processor, cause the processor to carry out steps of a method as succinctly described above.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
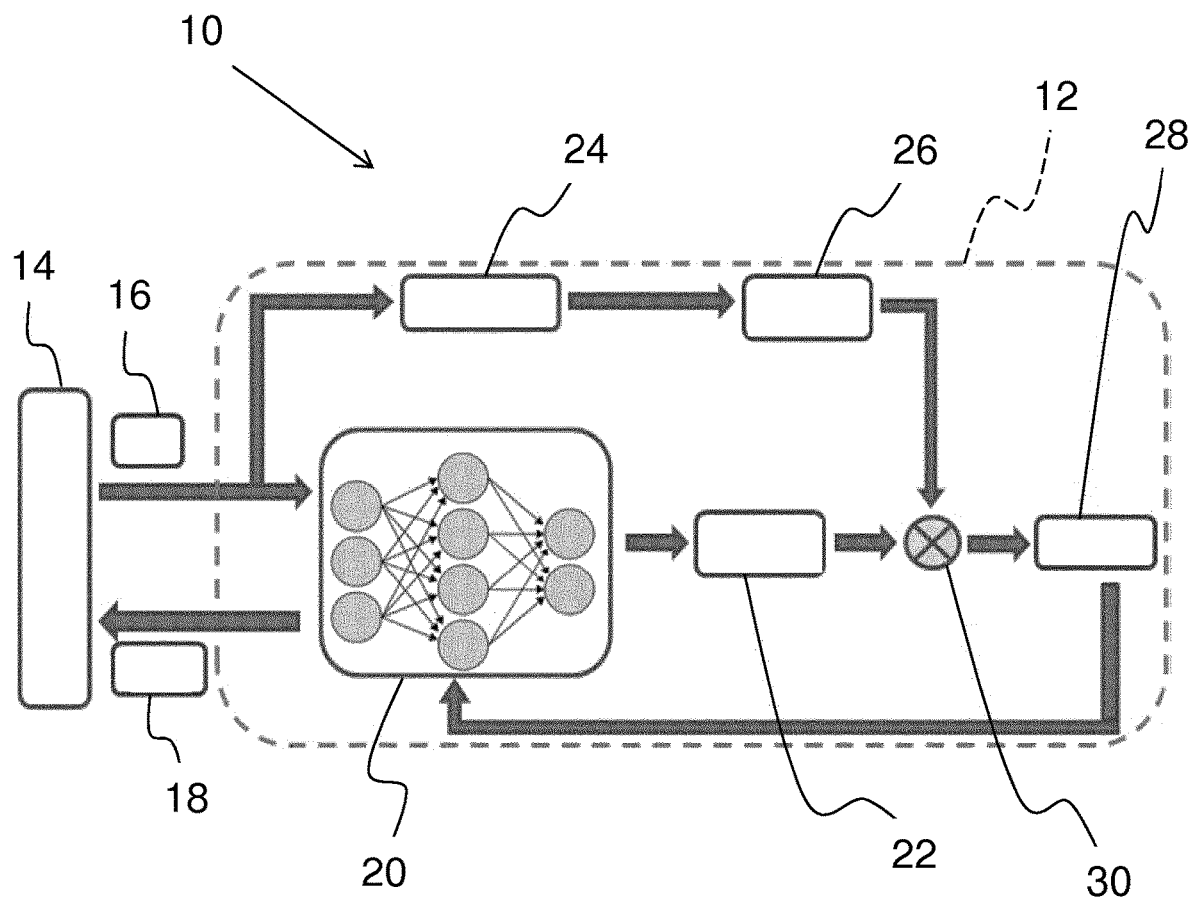
FIG. 1 is a schematic view of a system for determining parameters used to manufacture an optical article according to the invention, in a particular embodiment.

In the description which follows, the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

FIG. 1 is a schematic view of a system 10 for determining parameters used to manufacture an optical article according to the invention, in a particular embodiment. Such parameters will be referred to as "specification parameters". They may relate to the optical and/or geometrical properties of the optical article, as well as to its manufacturing process.

The system 10 comprises a lens design module (LDS) 12 and a laboratory management system (LMS) 14. The LMS 14 sends prescription parameters 16 to the LDS 12 and receives from the LDS 12 computation results 18 enabling manufacturing of an optical article which, in a particular embodiment, comprises at least one ophthalmic lens.

The prescription parameters 16 comprise all the features relating to the prescription, such as the ophthalmic correction required by the prescription for correcting one or more visual deficiencies, the selected frame, the material and possibly other features regarding the desired final product, such as the type of semi-finished lens to be used and specific optical requirements.

The computation results 18 comprise a set of predicted specification parameters. The predicted specification parameters may include optical and/or geometrical data relating to the optical article (e.g. thickness characteristics, wearer power compensations, etc.) and/or at least one parameter relating to a manufacturing process required to manufacture the optical article (e.g. parameters for a given manufacturing equipment such as a blocking ring to be used on an alloy blocker, as detailed below).

According to the invention, the system 10 further comprises one or more neural networks 20 which, in a particular embodiment, may be embedded inside the LDS 12.

The manufacturing process of an ophthalmic lens may comprise a grinding step, during which the ophthalmic lens is presented at a proper angle to a grinding wheel. To that end, a blocking step consists of using a tool called a blocking ring, which is known by the skilled person, for blocking the ophthalmic lens in the appropriate position with respect to the grinding wheel.

The invention makes it possible to predict the blocking rings to be used in the blocking steps.

In the particular embodiment shown in FIG. 1, the system 10 comprises one neural network 20. As a non-limiting example, the neural network 20 may have eight input neurons and twenty-four output neurons, with one output neuron per blocking ring. In that example, the eight inputs are as follows: type of manufacturing process, refractive index value, prescription sphere, prescription cylinder, prescription addition, semi-finished lens base, diameter to grind and semi-finished lens diameter.

In addition, as a non-limiting example, the neural network 20 may have one hidden layer with thirty neurons. As a variant, the neural network may have more than one hidden layer and different numbers of neurons in the hidden layers, different numbers of neurons at the input of the network and different numbers of neurons at the output of the network.

In any case, the data entered into the neural network 20 have to be formatted so as to be adapted to the number of inputs and outputs of the neural network 20.

The neural network 20 receives prescription parameters 16 as an input, and outputs prediction results 22 that contain all the necessary predicted specification parameters computed by the neural network 20 regarding the optical article to be manufactured.

The neural network 20 is configured to predict a predefined piece of data. For each piece of data to be predicted, the input neurons of the neural network 20 are configured to match the data input and the output neurons are configured to match the type of data to be predicted. The hidden layers of the neural network 20 are configured so as to provide the most accurate output.

Figure 2:
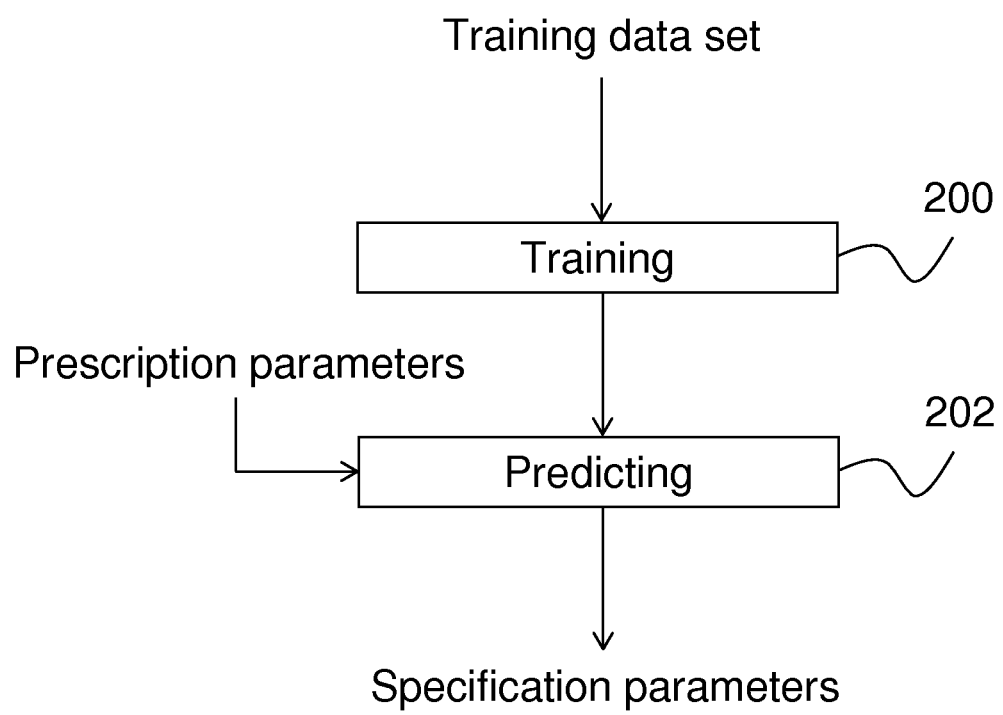
FIG. 2 is a flowchart showing steps of a method for determining parameters used to manufacture an optical article according to the invention, in a particular embodiment.

According to the invention, in order to be operational and be able to predict the specification parameters of an optical article, the neural network 20 undergoes a training step 200, as shown in FIG. 2.

During the training step, a training data set comprising a plurality of training prescription parameters and corresponding training specification parameters, previously computed by means of the usual logic and optimization resources 24, is entered into the neural network 20. Advantageously, a large quantity of training data is used in order to improve the prediction capability of the neural network 20.

In a particular embodiment, the training step comprises teaching the neural network 20 how to select an appropriate blocking ring for manufacturing a given optical article.

In a particular embodiment, the training step comprises an iterative phase including measuring an error 28 in the output of the neural network 20 and updating weights in the neural network 20 in order to reduce the error 28.

The error 28 is measured in a comparison module 30, in which the prediction results 22 are compared with the computation results 26. As a non-limiting example, the error 28 may be the variance between the prediction results 22 and the computation results 26.

The training step 200 may be carried out until the error 28 is below a predetermined threshold.

As a variant, the training step 200 may be carried out for a predetermined number of iterations of the iterative phase. As a non-limiting example, the predetermined number of iterations may be at least 2000.

Once the neural network 20 is fully trained, it is able to predict, in a step 202 shown in FIG. 2, specification parameters of an optical article, on the basis of input prescription parameters relating to the optical article.

In a particular embodiment, the method according to the invention is computer-implemented. Namely, a computer program product comprises one or more stored sequences of instructions that are accessible to a processor and that, when executed by the processor, cause the processor to carry out steps 200 and 202 described above.

The sequence(s) of instructions may be stored in a computer readable storage medium.

The method, system and computer program product according to the invention may be used not only for significantly reducing the time and costs involved in manufacturing optical articles, but also in a point of sale, when the optician dispensing a pair of glasses to a customer wishes to know what the ophthalmic lenses will look like with the customer's prescription, depending on the thickness and weight of the ophthalmic lenses and possible options chosen by the customer. Such operation is very sensitive to computation time, since the person dispensing the pair of glasses is in front of the customer in the meantime. Thanks to the reduction in computation time provided by the invention, such operation will be significantly accelerated and will thus bring greater satisfaction to the customer.

Although representative processes and articles have been described in detail herein, those skilled in the art will recognize that various substitutions and modifications may be made without departing from the scope of what is described and defined by the appended claims.

The invention claimed is:

1. A method for determining specification parameters used to manufacture at least one ophthalmic lens, said specification parameters including one or more of: (i) optical and/or geometrical data relating to said at least one ophthalmic lens, and (ii) at least one parameter relating to a manufacturing process required to manufacture said ophthalmic lens, the method comprising:
    training at least one neural network to predict said specification parameters used to manufacture the at least one ophthalmic lens, by using a training data set comprising a plurality of training prescription parameters and corresponding training specification parameters; and
    predicting the specification parameters of said at least one ophthalmic lens by said at least one trained neural network, from prescription parameters relating to said at least one ophthalmic lens, based on said training.

2. The method according to claim 1, wherein said prescription parameters relating to said at least one ophthalmic lens comprise at least one parameter relating to an ophthalmic correction to correct a specific visual deficiency.

3. The method according to claim 2, wherein said training comprises teaching said neural network how to select an appropriate blocking ring to manufacture said at least one ophthalmic lens.

4. The method according to claim 2, wherein said neural network has 8 input neurons and 24 output neurons.

5. The method according to claim 2, wherein said training comprises an iterative phase including measuring an error in the output of said neural network and updating weights in said neural network in order to reduce said error.

6. The method according to claim 1, wherein said training comprises teaching said neural network how to select an appropriate blocking ring to manufacture said at least one ophthalmic lens.

7. The method according to claim 6, wherein said neural network has 8 input neurons and 24 output neurons.

8. The method according to claim 6, wherein said training comprises an iterative phase including measuring an error in the output of said neural network and updating weights in said neural network in order to reduce said error.

9. The method according to claim 1, wherein said neural network has 8 input neurons and 24 output neurons.

10. The method according to claim 9, wherein said training comprises an iterative phase including measuring an error in the output of said neural network and updating weights in said neural network in order to reduce said error.

11. The method according to claim 1, wherein said training comprises an iterative phase including measuring an error in the output of said neural network and updating weights in said neural network in order to reduce said error.

12. The method according to claim 11, wherein said training is carried out until said error is below a predetermined threshold.

13. The method according to claim 11, wherein said training is carried out for a predetermined number of iterations of said iterative phase.

14. A system for determining specification parameters used to manufacture at least one ophthalmic lens, said specification parameters including one or more of: (i) optical and/or geometrical data relating to said at least one ophthalmic lens, and (ii) at least one parameter relating to a manufacturing process required to manufacture said ophthalmic lens, the system comprising:
    at least one neural network predicting said specification parameters by performing the method according to claim 1.

15. An ophthalmic lens manufactured by using the specification parameters determined by implementing the method according to claim 1.

16. A non-transitory computer-readable medium on which is stored a computer program comprising one or more sequences of instructions that are accessible to a processor and that, when executed by said processor, cause said processor to carry out the method according to claim 1.

* * * * *